May 28, 1968 V. T. REYNOLDS 3,386,076
SYSTEM FOR SEPARATING THE IN-PHASE WAVES FROM THE
OUT-OF-PHASE WAVES DETECTED BY PLURAL GEOPHONES
Filed May 6, 1966 4 Sheets-Sheet 2
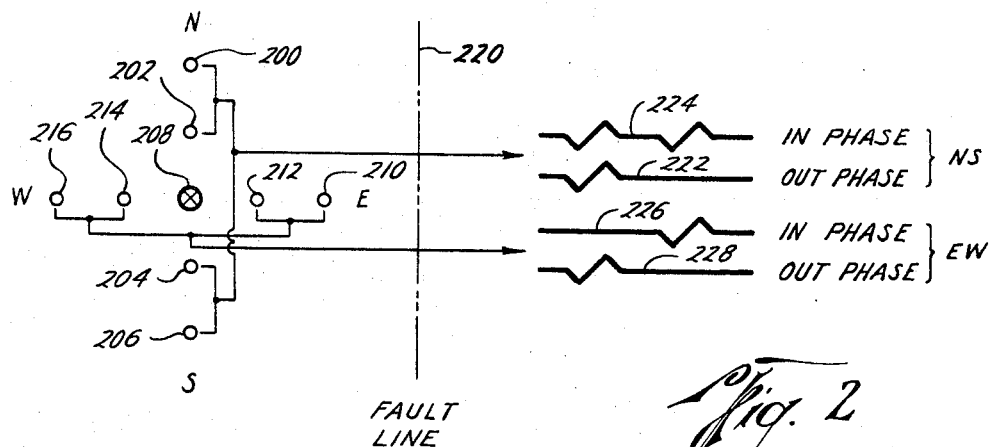
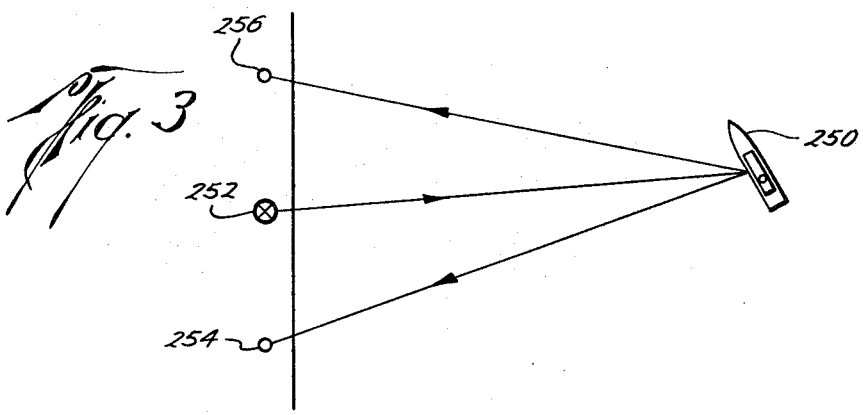
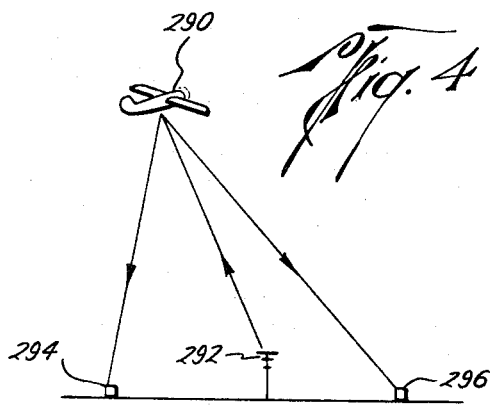
Vining T. Reynolds
INVENTOR.
BY James A. Bargfrede
ATTORNEY Vining T. Reynolds
INVENTOR.

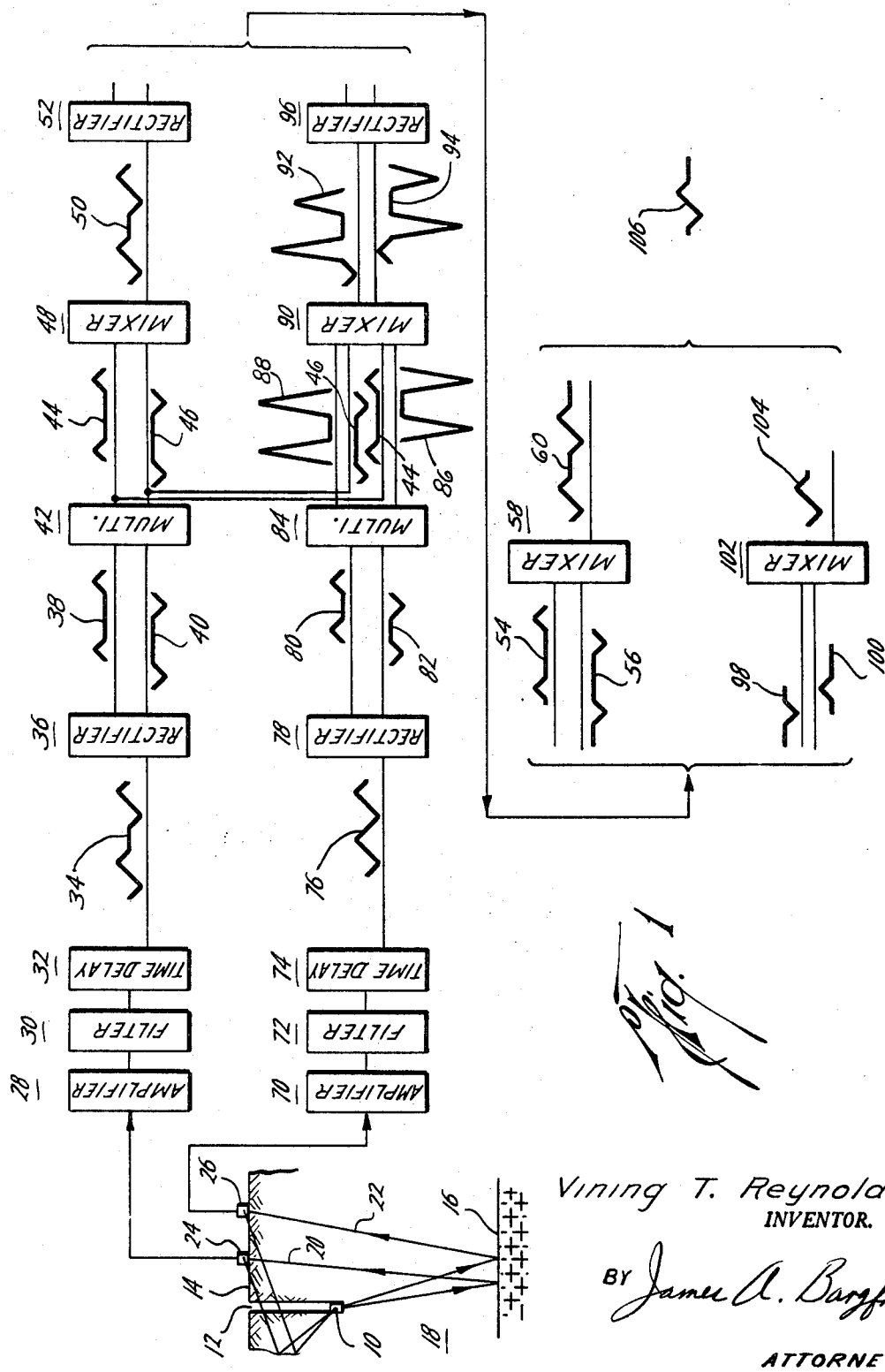

BY Hayden & Pravel
ATTORNEYS

United States Patent Office 3,386,076
Patented May 28, 1968

3,386,076
SYSTEM FOR SEPARATING THE IN-PHASE WAVES FROM THE OUT-OF-PHASE WAVES DETECTED BY PLURAL GEOPHONES
Vining T. Reynolds, 1302 S. Post Oak Lane, Houston, Tex. 77027
Continuation-in-part of application Ser. No. 434,460, Feb. 23, 1965. This application May 6, 1966, Ser. No. 554,624
9 Claims. (Cl. 340—15.5)

ABSTRACT OF THE DISCLOSURE

The signal detected by one of a plurality of spaced geophones is separated into two separate signals consisting, respectively, of the negative and positive components of the original signal. The two resulting signals are inverted and mixed with another of the detected signals to produce a resultant signal which represents only those portions of the two signals which were either in-phase or out-of-phase.

*Cross reference to a related application*

This application is a continuation-in-part of copending application Ser. No. 434,460 filed Feb. 23, 1965 which in turn is a continuation of an earlier copending application Ser. No. 141,520 filed Sept. 28, 1961. Both said application Ser. No. 434,460 and said application Ser. No. 141,520 are now abandoned.

This invention pertains generally to a detection system and particularly to a detection system wherein medium changes which create new wave sources, with respect to an original source, may be determined. Such a detection system may be utilized in the wave exploration of subterranean mediums as well as other mediums.

Wave exploration apparatus and methods of recording signals which are returned from an original wave source are known. Such wave exploration apparatus and methods are used extensively in oil exploration, water exploration for detecting the presence and location of submarines, air exploration, and space exploration. Generally, the wave exploration methods used up to the present time have employed a shock wave, thereby propagating a spherical wave front initiated in a particular medium. The time arrival or arrivals of events represented by return waves are observed and identified as reflections or refractions. The arrival time is compared with the shock instant assuming a velocity in the particular medium, and thus the distance of such medium from the shock source may be determined. More recently, means have been employed for directing the waves in a certain direction and receiving the waves from a certain direction in order to emphasize the signals therefrom. The present invention provides apparatus and a method of allowing the spherical waves to spread out in all directions from the source, with the returned signals being received from all directions. The source of the returned signals may be determined both as to distance from the source and location therefrom. Basically, the invention provides means and a method for solving the equations $z=x+y$, $z$ being designated as received, composite signal data, $x$ being in-phase data, and $y$ being out-of-phase data. The method of solving this equation may be utilized in oil exploration to possibly determine location of anticlines, fault structures, fault truncation of beds, termination of bedding planes, facies changes, permeability terminations, porosity terminations, oil and gas contacts, oil and water contacts, or any phenomenon which provides a change of velocity and creates a new source of wave motion at such change. In brief, the present invention provides for elimination of all unknowns in the received data with the exception of one unknown.

Thus, an object of the present invention is to provide improved means for analyzing data received in the form of wave signals from a source to determine the location of such source.

Another object of the present invention is to provide a method of analyzing a three-element equation when two of such elements are unknown.

Yet another object of the present invention is to provide means and a method for presenting in-phase and out-of-phase signal data, such data being propagated by an unknown source in response to an initial shock wave.

Still another object of the present invention is to provide improved apparatus and methods of seismic exploration.

Yet another object of the present invention is to provide seismic exploration apparatus wherein the data to be analyzed is reduced to a single unknown variable, such variable being either the coefficient of reflection or velocity distribution.

One object of the present invention is to provide new and improved means for and a method of improving the quality of "raw" seismic data wherein the undesired signal representations are selectively canceled in accordance with selective mixing techniques as taught by the present invention.

Other objects and advantages of the present invention will become more readily apparent from a consideration of the following description and drawings wherein:

FIG. 1 is a combined plan view and block diagram showing the invention as utilized in seismic exploration;

FIG. 2 is a plan view of a typical seismic exploration arrangement which may utilize the present invention;

FIG. 3 shows the present invention as used for locating a ship on a body of water;

FIG. 4 shows the present invention as utilized in detecting the presence and location of aircraft;

Figure 5:
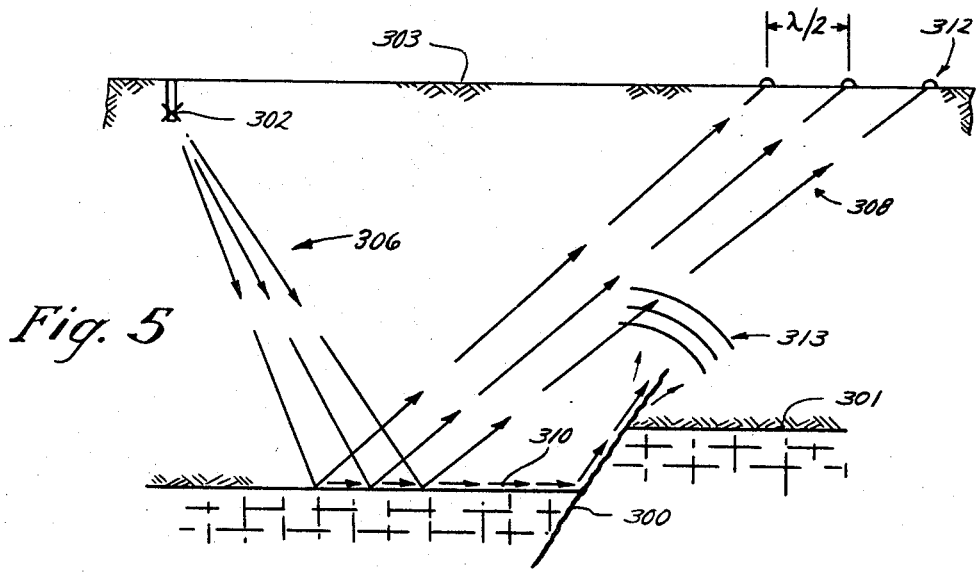
FIG. 5 represents a typical geophysical exploration problem wherein seismic vibrations travel along an interface to effect a secondary point of radiation.

Briefly, the invention is concerned with solving the equations $z=x+y$, where $z$ is wave data received from a plurality of wave sources in response to an initial wave signals, $x$ is in-phase wave data, and $y$ is out-of-phase wave data. The received wave signals are amplified, filtered, passed through a time-delay network, and then rectified and separated by a half-wave rectifier circuit. The output of the half-wave rectifier circuit is fed to a multiplier, and the output of the multiplier is applied to a mixer circuit where the signal components are combined. The output of the mixer circuit is applied to another half-wave rectifier circuit, and the output thereof is applied to the input of another mixer circuit. The mixer circuit output is combined with the output of other channels operating in a manner similar to that first described, and the final output provides a signal which is representative of either the in-phase or out-of-phase signals which were received.

Referring now to the drawings in detail, FIG. 1 shows the invention as incorporated in seismic exploration. An explosive charge 10 positioned in well bore 12 below the surface 14 of the earth is detonated. Upon detonation, shock waves are propagated in all directions in accordance with known laws of nature. Upon reaching a medium 16 having a different velocity coefficient from that of medium 18, waves indicated by lines 20 and 22 are reflected to geophones 24 and 26, respectively. For simplicity, refracted signals are not shown, but such signals may be propagated to the geophones.

Signals received by the geophones contain many varying characteristics and quantities, particularly if the subterranean structures are complex. The signals received by geophones 24 are fed to an amplifier 28, a filter 30, and a time-delay circuit 32; the output of time-delay circuit 32 has a visual representation indicated by trace 34. Amplifier 28 may be of a known type; filter 30 may be of the narrow band pass frequency type to select a desired frequency. The distance between geophones 24 and 26 should be equal to one-half the wave length of the frequency selected by the filter 30 while considering the velocity coefficient of the strata being studied. Time-delay circuit 32 aids in the one-half wave-length spacing. The trace 34 is typical of that obtained with a galvanometer-type recorder.

The signal represented by trace 34 is fed to a rectifier 36 where the positive or upper portions of the signal are separated from the negative or lower portions of the signal, thereby providing traces 38 and 40. Traces 38 and 40, it may be observed, are components of the composite trace 34, the phasing of traces 38 and 40 with regard to each other remaining the same as in trace 34.

The signals designated by traces 38 and 40 are fed to a multiplier 42 whose function is to multiply the input signal by a constant $(n)$ greater than unity. The output of multiplier 42 is represented by traces 44 and 46. The signals represented by traces 44 and 46 are fed to mixer 48 which provides a signal trace 50 which is fed to a rectifier 52. Rectifier 52 separates signal 50 into two components 54 and 56 which are fed to mixer 58. The output of mixer 58 is signal trace 60 which is identical to trace 34 inasmuch as the signals represented for traces 38 and 42 were not multiplied in the multiplier 42 by the constant $(n)$ but only by unity in order to simplify the explanation of the invention.

Likewise, signals from detector 26 are applied to an amplifier 70, filter 72, and time-delay circuit 74 to provide a signal represented by trace 76, part of which is not in phase with trace 34.

Trace 76 is fed to a rectifier 78 which separates the signal into the two components 80 and 82, as explained previously. The signals represented by traces 80 and 82 are applied to multiplier 84 where multiplication by a constant $(n)$ occurs to provide traces 86 and 88 which are traces $(80 \times n)$ and $(82 \times n)$, respectively. Traces 86 and 88 and traces 44 and 46 from geophone 24 circuit are fed to mixer circuit 90. The output of the mixer circuit 90 is a signal represented by trace 92 which is a combination of traces 46 and 88, and trace 94 which is a combination of traces 44 and 86.

The output of mixer 90 is fed to rectifier 96 which has an output of trace 98 and traces 100. Trace 98 is the negative or lower component of trace 92, and trace 100 is the positive or upper component of trace 94.

The signals are fed to a mixer 102 which provides a signal represented by trace 104. Combining traces 60 and 104 provides a trace 106 which is either $x$ or $y$ in the equation $z=x+y$, where $z$ is a composite complex signal having in-phase components $x$ and out-of-phase components $y$.

In effect, the system of FIG. 1 solves the equation $z=x+y$ through use of signals $a_1$ and $a_0$ and signals $b_1$ and $b_0$. Signals $a_1$ and $b_1$ are positive components, while $a_0$ and $b_0$ are negative components. Each positive and negative component is multiplied by unity and by the constant $(n)$ to give:

$$
\begin{array}{ll}
a_1 \times (1) & b_1 \times (1) \\
\vdots & \vdots \quad : \text{ positive} \\
a_1 \times (n) & b_1 \times n \\
a_0 \times 1 & b_0 \times 1 \\
\vdots & \vdots \quad : \text{ negative} \\
a_0 \times n & b_0 \times n
\end{array}
$$

The positive total is therefore $(a_1+b_1)+(n(a_1+b_1))$, and the negative total is $a_0+b_0+(n \times (a_0+b_0))$.

The apparatus of FIG. 1 reduces these equations to the point that either $a_0$ and $a_1$ are unknown or $b_0$ and $b_1$ are unknown. Thus, trace 106 will be representative of $a_0+a_1$ or $b_0+b_1$.

In FIG. 2, four north-south geophones 200, 202, 204, and 206 are aligned with a shot hole 208. East-west geophones 210, 212, 214, and 216 are also aligned with shot hole 208. A fault line 220 will provide north-south traces 222 and 224, with trace 222 representing out-of-phase signal data reflected from a source other than the fault, and trace 224 representing in-phase signal data reflected from the fault line. Similarly, trace 226 represents in-phase signals from the east-west geophones, and trace 228 represents out-of-phase signals from the east-west geophones. The traces 222, 224, 226, and 228 may be solved in accordance with the method described in explaining FIG. 1, thus allowing location of fault line 220. Similarly, other subterranean phenomena can be located through variations in the shot hole patterns. Where known methods utilize either seismic reflections or refractions in compiling data for study, the present invention allows all received information whether it be from refractions or reflections to be utilized effectively, primarily through utilization of half-wave rectifiers.

FIG. 3 shows another use of the present invention when applied to locating the position of a ship 250 by means of a signal source 252 and detectors 254 and 256.

FIG. 4 likewise shows how the position of an aircraft 290 may be located by a signal source 292 and detectors 294 and 296 in accordance with the present invention.

Thus, the invention provides apparatus and a method for studying the location of sources of new waves through solution of an equation having in-phase information and out-of-phase information as two unknowns comprising the whole. The apparatus and method of the present invention are particularly adapted for seismic exploration for oil inasmuch as known apparatus and method have discarded much information which has been considered to be unusable but which is usable in the present invention.

FIG. 5 represents by way of example one problem arising in the collection and reduction of geophysical data. While FIG. 5 is an example and only representative of problem areas encountered in geophysical exploration, it should be noted that the representation of FIG. 5 illustrates a fault indicated by the numeral 300 which interdicts or interrupts the interface 301. The interface 301 is the interface of interest in the example represented in FIG. 5, and for the purposes of obtaining geophysical information about same, a shot hole is indicated at 302 at the surface 303 for purposes of geophysical exploration. The shot hole is adapted to receive in a conventional manner an explosive material or the like which is used to radiate a spherical wave front, the vibrations of which are used in obtaining geophysical data. The wave front travels along the directed rays indicated generally at 306, and such waves 306 are reflected at the interface 301 along a new plurality of paths generally indicated at 308. In addition, vibratory energy is directed along the face of the interface 301 as best indicated by the line 310.

Such energy is directed along the interface 301 and can travel for an indefinite length thereabove, to be reflected at the fault 300 in accordance with the purposes of the present example. The fault 300 directs the energy upwardly and thus effects a secondary or spurious point of radiation. It will thus be appreciated that the geophones indicated generally at 312 are provided with the signal traveling the direct route along the directed rays 306 and 308 and also receives the spurious radiation indicated generally at 313. Thus, in accordance with the example of FIG. 5A, it will be appreciated that the desired geophysical information is obtained by the direct reflective route to the interface 301, whereas spurious radiation may come from any other source, such spurious radiation being generated in the example of FIG. 5 by the fault 300.

A similar situation occurs in the detonation of explosive charges in water. Therefore, attention is directed to FIG. 5A which illustrates for purposes of discussion a boat or a small vessel 316 shown sailing at the surface of the water 318 wherein an explosive charge has been detonated at 320 to the stern of the boat or vessel 316. In the detonation of explosive charges in water, it will be appreciated that such an explosion expands temporarily to form an essentially evacuated volume such as indicated at 321 wherein the bubble or evacuated volume is formed and has a short duration of existence and thereafter collapses. It will be appreciated that the initial explosion of the explosive materials transmits a first plurality of spherically radiating wave fronts indicated generally at 322 resulting from the detonation of the explosive charge. In addition, the rapid evacuation of a volume beneath the surface of the water is the predicate of a second explosive noise which really results from the implosion of the liquid collapsing in the partially evacuated volume and generates a second radiation wave front indicated generally at 323. The relative size of wave fronts 322 to 323 is such that they are substantially equal. Therefore, it will be appreciated that the second blast generating the spherical wave fronts indicated at 323 forms a spurious signal which is generally undesirable.

Figure 5A:
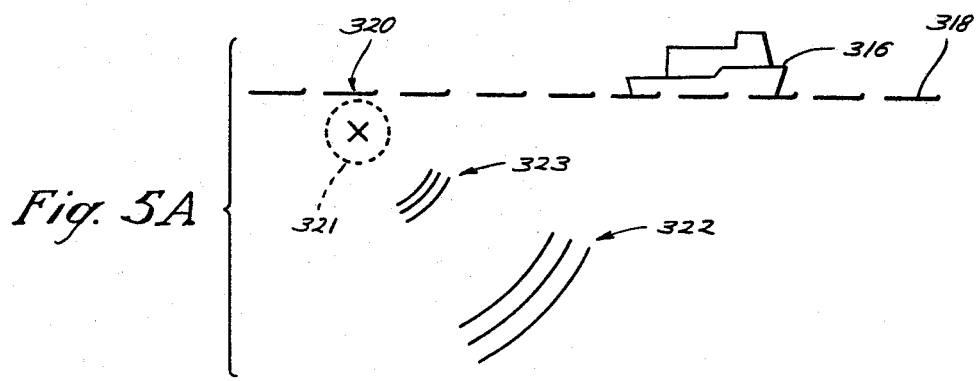
FIG. 5A represents aquatic techniques of geophysical exploration wherein an explosive charge is detonated in the water.

One alternative technique to eliminating the second plurality of spherical radiation wave fronts best illustrated at 323 in FIG. 5A is to so calculate the size of the explosive and the depth of detonation that the explosion occurs sufficiently near the surface of water to permit the explosive energy to propel a geyser of water upwardly above the surface and to actually contact the evacuated bubble 321 with the air above the body of water. This enables the water to refill the evacuated volume from below so that the implosion is avoided to eliminate the second wave front. However, it will be appreciated that such control of explosions is somewhat difficult to achieve and is partially dependent on having a relatively calm ocean which cannot be necessarily obtained at all times.

In the instances above described relative to FIGS. 5 and 5A, both instances illustrate the sources or origins of spurious signals to be recorded by geophones which are preferably eliminated by the means of the present invention. For purposes of description of the present invention, reference is made to the additional figures including FIGS. 6 and 6 A to be described.

Figure 6:
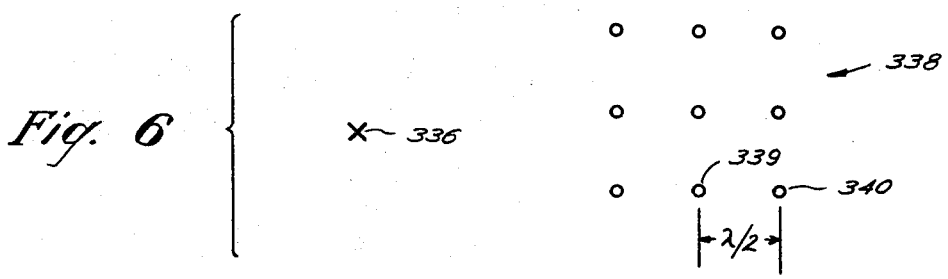
FIG. 6 is a pattern for placing geophones in accordance with the invention presently disclosed.

FIG. 6 illustrates a geophone pattern and a shot point, the shot point being indicated at 336 and the geophone pattern being indicated at 338. Shot point 336 may be any conventional shot point in land based geophysical exploration wherein a shallow hole is drilled and an explosive charge is placed therein for detonation. Also, it may be the point of explosion of a charge dropped into water from the rear or stern of a moving boat wherein the geophones indicated generally in the field 338 are towed on various towlines and other aquetic apparatus for maintaining same in the pattern shown in FIG. 6 as the boat or vessel moves through the water. At any event, one factor of interest shown in FIG. 6 is the fact that geophones 339 and 340 are arranged approximately one-half wave length apart from one another. The same pattern of spacing should be extended to the other geophones in the field 338 as will be noted in discussing the operation of the present invention. The wave length of interest is generally considered to be in the vicinity of 30 cycles per second which is a factor resulting usually from the physical characteristics of the weathered layer of materials found at most surface areas of the earth and is not a critical factor to the present invention. Moreover, the characteristic velocity is such that one-half wave length spacing in the field 338 is usually something on the order of 110 feet in most arrangements so that one dozen geophones can be arranged linearly in a quarter of a mile. Again, these factors result from the general characteristics of the earth as a vibratory body and are not particularly related to the present invention except as by way of passing interest. The arrangement of geophones in a rectangular or rectilinear grid as best illustrated in FIG. 6 will be discussed in greater detail hereinafter.

Figure 6A:
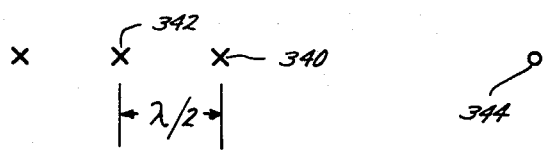
FIG. 6A is an alternative pattern for relating geophones to explosive charges in accordance with the invention presently disclosed.

FIG. 6A differs from FIG. 6 in that FIG. 6A utilizes a plurality of shot points 340 and 342 which are arranged from one another by a distance of one-half wave length and which further co-operate with a single geophone indicated at 344. It will be appreciated that the utilization of three separate shots results in the formation of three signals at the geophone 344 which can be recorded and superimposed relative to the shot time of each so as to obtain a relative spacing co-operative with the techniques of the present invention as will be described. In other words, a time delay related to the time required to travel one-half wave length is again achieved; however, this difference is achieved in FIG. 6A by utilization of multiple shot points with the desired spacing while contrasted with the arrangement in FIG. 6 which utilizes multiple geophones along such spacing. Therefore, in view of both FIGS. 6 and 6A, attention is next directed to FIG. 7.

Figure 7:
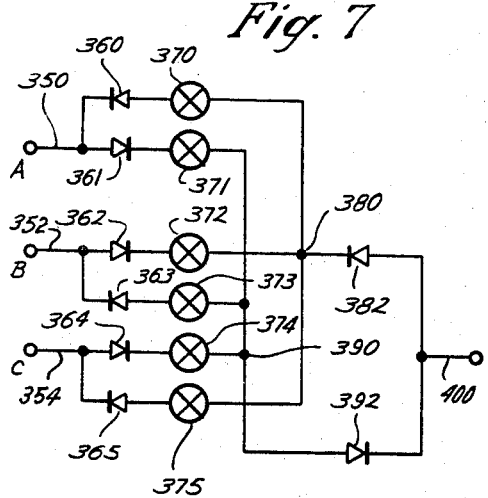
FIG. 7 is an electrical schematic of apparatus for operation in accordance with the present invention.

In FIG. 7, the inputs from a plurality of geophones are represented by the conductors communicating with the symbols A, B, and C. Conductors 350, 352, and 354 all communicate with the geophone sources indicated at A, B, and C. It will be appreciated that the conductors 350, 352, and 354 may actually communicate with a seismic data playback apparatus such as those already known to the art so that the data may be played back with convenience many hours after it is obtained, if necessary. At any event, data or information is provided in the form of three analog signals to the conductors 350, 352, and 354 to a plurality of diodes as illustrated. The diodes are indicated by reference numerals 360 through 365, inclusive. The output of the plurality of diodes is provided to a plurality of multipliers indicated generally at 370 through 375, inclusive. The multipliers provide equal levels of operation to the various signals to remove plateaus from the output signal of the apparatus as will be described. The multipliers are preferably provided with some arbitrary range of multiplication which may be less than unity or greater than unity, as the choice may be. Moreover, the multipliers are significant only from the point of view of providing balance of the signals between the multiple channels shown in FIG. 7 and further provide a form of permanent alignment for the apparatus to accommodate any variations in parameters in the amplifying apparatus communicating with the input conductors 350, 352, and 354.

The output of the multipliers is provided to a pair of junctures indicated at 380 and 390. Juncture 380 is provided with an input signal composited from all three signals input to the apparatus of FIG. 7, and the same is true of juncture 390. However, the proper or specific selection of the signals to be added at 380 and 390 is best stated in the form of an equation with the juncture 380 being given in the first below written equation and the juncture 390 being given in the second equation:

$$V_{380} = A_0 + B_1 + C_0$$
$$V_{390} = A_1 + B_0 + C_1$$

where the negative components of signal are denoted by the subscript "0" and the positive components are denoted by the subscript "1."

The outputs of juncture points 380 and 390 are rectified at 382 and 392 in accordance with the terms of the present invention, and the output of these two diodes are interconnected to provide the output of the apparatus at 400. It will be appreciated that the use of the geophones A, B, and C spaced at one-half wave lengths effects an average which may be best represented by the output of the geophone B since it is the center point of the geophone spread above described. This is, in fact, what is desired and preferred for the properly desirable signal information. However, it should be noted that the effects of the present invention on undesirable signals is such as to not provide merely an average or a mixing of the signals from the three geophone spread, but rather, spurious signal cancellation is accomplished as will be discussed with respect to FIGS. 9 and 9A by way of example hereinafter.

Figure 8:
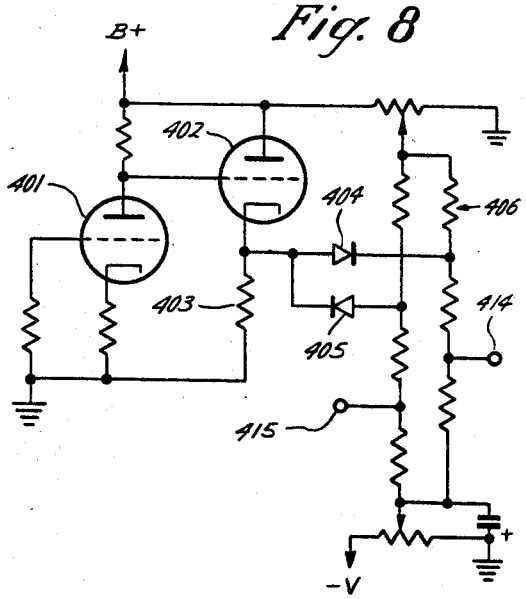
FIG. 8 is a schematic wiring diagram of a circuitry for use in the present invention.

Attention is directed to FIG. 8 which illustrates circuit apparatus for effecting some of the arrangements of the present invention. In FIG. 8, the apparatus provided can achieve the rectification of the diodes shown in FIG. 7 and the multiplier is also provided. Additionally, it will be appreciated that dealing with small analog signals introduces the necessity for amplification and various impedance matching devices which are exemplified in FIG. 8. It will be appreciated that other such arrangements can be provided to accommodate the practical problems noted in passing reference hereinabove. However, it should be noted that FIG. 8 includes the triode amplifier 401 to which the input signal from some geophone is provided, and the output of the tube 401 is directly coupled to the triode 402. The triode 402 is utilized as a cathode follower with the output signal taken across the resistor 403. The output of the cathode follower is provided to a pair of diodes 404 and 405 which then communicate with an impedance matching network indicated generally at 406. The output of the two diodes is provided at the terminals 414 and 415. In summarization, it should be noted that the apparatus shown in FIG. 8 provides one pivotal physical realization of the circuitry such as exemplified in channel A of FIG. 7 which includes the diodes 360 and 361 and the multipliers 370 and 371.

Figure 9A:
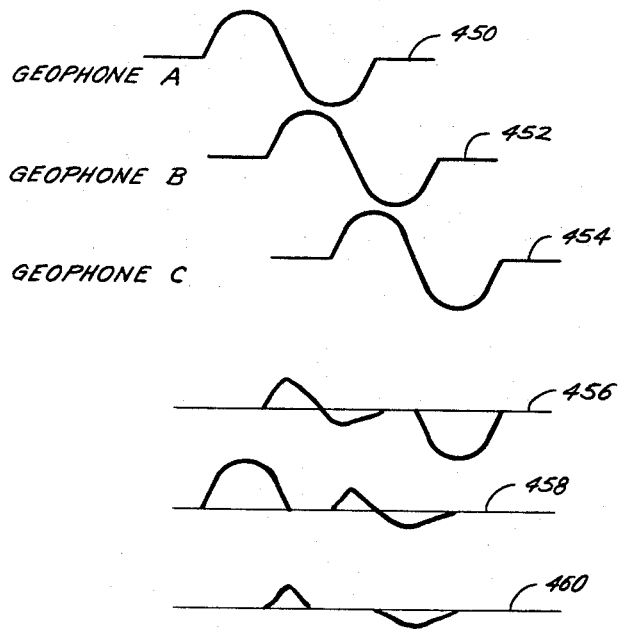
FIGS. 9 and 9A provide graphic assistance in illustrating the ability of the present invention to cancel spurious seismic signals.
Figure 9:
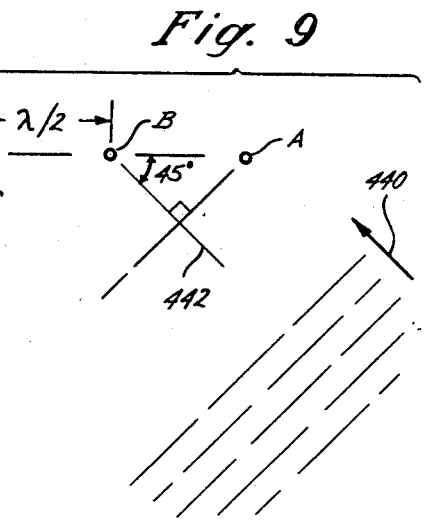

Operation of the present invention is best exemplified from cancellation of a spurious signal as represented in FIG. 9. It should be noted that FIG. 9 illustrates three geophones A, B, and C which are shown with one-half wave length spacing therebetween. Moreover, the arrow 440 represents a direction of a spurious radiation which is shown in the worst condition, such worst case being an angle of 45 degrees obliqueness to the line of the geophones indicated at A, B, and C. The direction of propagation which most nearly coincides with the direction or line of the string of geophones reduces the effect of spurious radiation so that it will be appreciated that it is a function of the sine of the angle of radiation with respect to the lengthwise arrangement of the plurality of geophones. At any event, it will be appreciated that the arrangement of the geophones A, B, and C with one-half wave length spacing therebetween customarily provides 180 degrees phase shift in the signals travels along the geophones A, B, and C when the signal travels along the line such as from geophone A to geophone B. However, the line of radiation indicated at 442 provides something other than 180 degrees phase shift, and reference is made to FIG. 9 wherein it is indicated that the phase shift between geophones A and B is 135 degrees. The same is also true of the relationship between geophones B and C.

FIG. 9A represents the traces of the three geophones in a rather simplified manner where the wave forms are indicated at 450, 452, and 454. The wave forms are added by the diode and multiplying networks provided in FIG. 7 and the voltage at point 380 is indicated by the wave form at 456. The voltage provided at point 390 is indicated by the wave form 458. The diodes 382 and 392 perform further rejection of spurious signals, and the wave form represented at 460 is the output of the apparatus shown in FIG. 7.

Thus, in conclusion, it will be noted that the large signals shown in FIG. 9A for the output of geophones A, B, and C which are assumed to have unity amplitude are reduced to signals of very small amplitude in the wave form 460 which is the result of operation of the circuit in FIG. 7. In further particular, it should be noted that the example of FIG. 9 is a worst case situation since it will be presumed that any deviation from linear coincidence can be reduced so that the sine of the angle approaches zero, and therefore the net output of the spurious signals is reduced to zero at the output of the apparatus. For purposes of the present invention, the word "selective" is used to describe the mixing and rejection achieved by the circuitry shown in FIGS. 7 and 8 and exemplified by the example of FIGS. 9 and 9A which illustrate the worst case condition.

Various alterations can be incorporated with the present invention as will be understood. For instance, the present invention may utilize a time delay circuit which effects a half wave length time delay on one signal so that the one given signal may be provided to a plurality of input channels with one of the channels being directly provided and delay corresponding to one-half wave length propagation provided for the second channel and a full wave length of delay provided for the third channel. Clearly, in this circumstance, the device of the present invention will dispose of spurious signals or the out-of-phase signals in the same manner as above described.

Briefly, the present invention relates to new and improved techniques of seismic data reproduction and clarification.

What is claimed is:

1. A device for providing a signal representation free of ambiguities caused by apparent signal sources, multiple paths of propagation, refraction, multiple reflections, and other characteristics of a space into which a wave is transmitted, comprising:
   (a) at least two detector means for receiving signals from real and apparent signals sources;
   (b) first circuit means communicated with said detector means for separating and forming the positive and negative wave components of the signals received by said detector means;
   (c) second circuit means connected to said first circuit means for amplifying the output of said first circuit means by a predetermined, fixed amount;
   (d) mixer means having plural outputs for combining outputs of said second circuit means;
   (e) additional circuit means for rejecting unwanted components in the signals appearing on the plural outputs of said mixer means; and
   (f) means for recombining the remaining nonrejected components of the signals appearing on said plural outputs of said mixer means to obtain a signal representation of the signal from one of the signal sources.

2. The invention of claim 1 wherein the detector means are geophones arranged in a pattern having a spacing therebetween related to the wave length of a selected frequency transmitted through the space.

3. The invention of claim 1 including three or more detector means arranged in a predetermined pattern and wherein said three detector means are indicated by the symbols A, B, and C and further wherein said first circuit means and said mixer means and said second circuit means and said additional circuit means and said means for recombining co-operate to provide a signal representation from the real signal source and obtain cancellation of apparent signal sources, said signals detected by said detector means being separated as follows:

$$A_0+B_1+C_0$$
$$A_1+B_0+C_1$$

where $A_0$, $B_0$ and $C_0$ are negative components of the waves received by the respective detector means and where $A_1$, $B_1$ and $C_1$ are the positive components of the waves received by the respective detector means.

4. The invention of claim 1 wherein three or more geophones are arranged in spacing approximately one-half wave length apart for the characteristic frequency of transmission through the medium and further wherein said second circuit means and said mixer circuit means are so arranged and connected to provide for addition of the voltages or signals:

$A_0+B_1+C_0$ and also provide $A_1+B_0+C_1$ where $A_0$, $B_0$ and $C_0$ are the negative components of the waves received by the respective detector means and where $A_1$, $B_1$ and $C_1$ are the positive components of the waves received by the respective detector means.

5. The invention of claim 4 further including rectification means for rectifying the signal $A_0+B_1+C_0$ and the signal $A_1+B_0+C_1$ and second mixer means for recombining the two rectified signals to provide a signal representation of the true real signal source.

6. A system for adding in-phase or out-of-phase signals comprising:
   (a) first, second and third detector means for detecting first, second and third signals respectively;
   (b) first rectifier means for separating said first signal into its positive and negative components;
   (c) second rectifier means for separating said second signal into its positive and negative components;
   (d) third rectifier means for separating said third signal into its positive and negative components;
   (e) first mixing means for producing an output signal by combining the negative components of said second signal with the positive components of said first and third signals;
   (f) second mixing means for producing an output signal by combining the positive components of said second signal with the negative components of said first and third signals;
   (g) fourth rectifier means for passing the positive components of the output signals from said first mixing means;
   (h) fifth rectifier means for passing the negative components of the output signal from said second mixing means; and
   (i) third mixing means for combining the positive signal components passed by said fourth rectifier means with the negative signal components passed by said fifth rectifier means.

7. The system of claim 6 wherein said first, second and third rectifier means each comprise:
   (a) a triode amplifier coupled with a triode cathode follower;
   (b) diode means for rectifying the output of the cathode follower; and
   (c) impedance matching means connected with said diode means.

8. A system for separating the in-phase waves from the out-of-phase waves in a plurality of waves detected by a plurality of detectors comprising:
   (a) first means for separating the waveform of a first signal detected by a first detector into negative and positive components;
   (b) second means for separating the waveform of a second signal detected by a second detector into negative and positive components;
   (c) third means for combining the negative components of said first signal with the inverted negative components of said second signal to produce a first resultant signal and for combining the positive components of said first signal with the inverted positive components of said second signal to produce a second resultant signal;
   (d) fourth means for separating the negative and positive components of said first resultant signal;
   (e) fifth means for separating the negative and positive components of said second resultant signal;
   (f) sixth means for producing an output by combining the negative signal components output by said fourth means with the positive signal components output by said fifth means; and
   (g) seventh means for combining the output of said sixth means with said first signal.

9. The system of claim 8 further including means for amplifying the signal output of said second means.

References Cited

UNITED STATES PATENTS

| | | | |
|---|---|---|---|
| 2,759,551 | 8/1956 | Carlisle et al. | 181—.5 |
| 2,871,461 | 1/1959 | Lee | 340—15.5 |
| 2,888,089 | 5/1959 | Piety | 340—15.5 |
| 2,906,363 | 9/1959 | Clay | 181—.5 |
| 2,926,249 | 2/1960 | Lindsey | 340—15.5 |

RODNEY D. BENNETT, *Primary Examiner.*

BENJAMIN A. BORCHELT, *Examiner.*

R. M. SKOLNIK, C. E. WANDS, *Assistant Examiners.*